United States Patent
Kraegeloh et al.

(10) Patent No.: US 9,659,232 B2
(45) Date of Patent: May 23, 2017

(54) POSITION DETERMINATION OF AN OBJECT BY SENSING A POSITION PATTERN BY AN OPTICAL SENSOR

(71) Applicant: Fraunhofer-Gesellschaft zur Foerderung der angewandten Forschung e.V., Munich (DE)

(72) Inventors: Stefan Kraegeloh, Erlangen (DE); Tobias Bliem, Erlangen (DE); Joerg Pickel, Happurg (DE); Christian Vey, Duesseldorf (DE); Rinat Zeh, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 205 days.

(21) Appl. No.: 14/120,358

(22) Filed: May 14, 2014

(65) Prior Publication Data
US 2014/0348379 A1    Nov. 27, 2014

Related U.S. Application Data

(63) Continuation of application No. PCT/EP2012/072513, filed on Nov. 13, 2012.

(30) Foreign Application Priority Data

Nov. 14, 2011    (DE) .................. 10 2011 086 318

(51) Int. Cl.
*G06K 9/62* (2006.01)
*G06F 3/03* (2006.01)

(52) U.S. Cl.
CPC ......... *G06K 9/6215* (2013.01); *G06F 3/0321* (2013.01)

(58) Field of Classification Search
CPC ............................ G06F 3/0321; G06K 9/6215
See application file for complete search history.

(56) References Cited

U.S. PATENT DOCUMENTS 5,625,353 A * 4/1997 Katagiri ................ G01D 5/145
324/207.11
2005/0099405 A1 * 5/2005 Dietz .................. G06F 3/03542
345/179

(Continued)

FOREIGN PATENT DOCUMENTS

CN    1875337    12/2006
CN    1875337 A  12/2006

(Continued)

OTHER PUBLICATIONS

Hiroshi, Yuuki , "Studying of Algorithm and Dara Structure by C# According to Yuuki Hiroshi", Studying of Algorith and Dara Structure by C# according to Yuuki Hiroshi, C# Magazine vol. 17, No. 7, total vol., Jul. 1, 2005, pp. 108-114.

*Primary Examiner* — Kim Vu
*Assistant Examiner* — Pinalben Patel
(74) *Attorney, Agent, or Firm* — Michael A. Glenn; Perkins Coie LLP

(57) ABSTRACT

An apparatus for determining a position of an object relative to a representation of an image to be represented includes a position pattern generator for generating a position pattern subdivided into a plurality of pattern portions, each of the pattern portions having an unambiguous bit pattern of a plurality of bit patterns, and the bit patterns being Gray-coded in a generalized manner; a combination unit for combining the position pattern with the at least one image to be represented and for providing a corresponding combined image; an optical sensor for optically sensing an image section of the combined image, being correlated with the object position; a filter for extracting at least one bit pattern (Continued)

corresponding to a pattern portion of the position pattern, from the image section and for providing at least one corresponding extracted pattern portion; and a determiner for determining the object position based on the extracted bit pattern. A method for determining the position of an object is also disclosed.

15 Claims, 12 Drawing Sheets

(56) References Cited

U.S. PATENT DOCUMENTS

| | | | | |
|---|---|---|---|---|
| 2006/0242562 | A1* | 10/2006 | Wang | G06F 3/0321 715/210 |
| 2007/0001950 | A1* | 1/2007 | Zhang | G06F 3/037 345/88 |
| 2008/0211183 | A1 | 9/2008 | Cortenraad et al. | |
| 2010/0231420 | A1 | 9/2010 | Wei et al. | |
| 2011/0014982 | A1* | 1/2011 | Hiraishi | A63F 13/04 463/36 |

FOREIGN PATENT DOCUMENTS

| | | |
|---|---|---|
| CN | 101882012 | 11/2010 |
| CN | 101882012 A | 11/2010 |
| JP | H07-212584 | 8/1995 |
| JP | H09-251152 | 9/1997 |
| JP | 2002-082763 | 3/2002 |
| JP | 2005-327259 | 11/2005 |
| JP | 2006-031859 | 2/2006 |
| JP | 2007-510966 | 4/2007 |
| RU | 2316820 C2 | 2/2008 |
| RU | 2324236 C2 | 5/2008 |
| WO | WO01/15059 | 3/2001 |

* cited by examiner

| B=synch<br>R=0= 0000<br>G=0= 0000 | B=synch<br>R=1= 0001<br>G=0= 0000 | B=synch<br>R=2= 0011<br>G=0= 0000 | B=synch<br>R=3= 0010<br>G=0= 0000 | B=synch<br>R=4= 0110<br>G=0= 0000 |
|---|---|---|---|---|
| B=synch<br>R=0= 0000<br>G=1= 0001 | B=synch<br>R=1= 0001<br>G=1= 0001 | B=synch<br>R=2= 0011<br>G=1= 0001 | B=synch<br>R=3= 0010<br>G=1= 0001 | B=synch<br>R=4= 0110<br>G=1= 0001 |
| B=synch<br>R=0= 0000<br>G=2= 0011 | B=synch<br>R=1= 0001<br>G=2= 0011 | B=synch<br>R=2= 0011<br>G=2= 0011 | B=synch<br>R=3= 0010<br>G=2= 0011 | B=synch<br>R=4= 0110<br>G=2= 0011 |

| B=synch<br>R=0= 0000<br>G=0= 0000 | B=synch<br>R=1= 0001<br>G=0= 0000 | B=synch<br>R=2= 0011<br>G=0= 0000 | B=synch<br>R=3= 0010<br>G=0= 0000 | B=synch<br>R=4= 0110<br>G=0= 0000 |
|---|---|---|---|---|
| B=synch<br>R=0= 0000<br>G=1= 0001 | B=synch<br>R=1= 0001<br>G=1= 0001 | B=synch<br>R=2= 0011<br>G=1= 0001 | B=synch<br>R=3= 0010<br>G=1= 0001 | B=synch<br>R=4= 0110<br>G=1= 0001 |
| B=synch<br>R=0= 0000<br>G=2= 0011 | B=synch<br>R=1= 0001<br>G=2= 0011 | B=synch<br>R=2= 0011<br>G=2= 0011 | B=synch<br>R=3= 0010<br>G=2= 0011 | B=synch<br>R=4= 0110<br>G=2= 0011 | sensor 1, sensor 2

POSITION DETERMINATION OF AN OBJECT BY SENSING A POSITION PATTERN BY AN OPTICAL SENSOR

CROSS-REFERENCE TO RELATED APPLICATIONS

This application is a continuation of copending International Application No. PCT/EP2012/072513, filed Nov. 13, 2012, which is incorporated herein by reference in its entirety, and additionally claims priority from German Application No. 102011086318.4, filed Nov. 14, 2011, which is also incorporated herein by reference in its entirety.

BACKGROUND OF THE INVENTION

The present invention relates to apparatuses for determining a position of a (physical) object and to image processing apparatuses and optical sensor apparatuses possibly used for this. Further, the present invention relates to a method for determining a position of an object. In particular, the present invention relates to determining the position of the object on, at or in relation to a screen or a display area.

Determining the position of a physical object can be applied in the context of user interfaces to enable tracking and/or visualizing of an actual physical position of the physical object, for example by a software running on a computer. There are, for example, so-called tangible user interfaces (TUI). For a subarea of the field of application of tangible user interfaces (TUI), physical objects are to be placed on a computer screen, which is lying flat, whose positions and possibly orientations can be determined automatically by the computer. Thereby, the physical objects can be linked to representations on the screen, such that a movement of these objects can cause an immediate reaction in the computer. The impression that the physical objects belong to the representations on the screen is created, the representations become directly 'tangible'. The technical teachings disclosed herein describe techniques efficiently allowing such position recognition.

One method of detecting the position of the object is to sense the object by a camera which is either mounted above or below the screen (e.g. in connection with a transparent projection screen), which is, for example applied in the product Microsoft Surface™. In a refinement of this technology, marketed as Microsoft Surface 2, a matrix of light-sensitive sensors replacing the camera is integrated directly into the screen. Thus, in these approaches, either additional external cameras and/or specific screen hardware is necessitated. Another known approach (see, for example, International Patent Application having the publication number WO 01/15059 A2 from 2000) manages without specific screens. In this approach, image signals are shown on the screen, from which the position on the screen can be detected when the same is recognized and evaluated by the applied objects. The applied objects have optical sensors and a radio channel to the computer to be able to recognize the position and to transmit the same to the computer.

Typically, it is desirable that invisibility or at least low perceptibility of the superimposed information patterns can be ensured. In the mentioned International Patent Application WO 01/15059 A2, different options are described how information signals can be superimposed on a background image to thereby detect the position of the physical objects. In one of these variations, the superimposed information is location-dependent with respect to the screen, i.e. different patterns, whose recognition allows a direct conclusion regarding the location, are superimposed in different areas of the screen. These patterns can be formed either in the area or in time. In particular, it is intended that the patterns are active simultaneously for all image areas. This results in the desire that the superimposed patterns are to be invisible to the user. For solving this problem, WO 01/15059 A2 merely suggests the usage of specific screen hardware which can radiate light signals in the non-visible range. A solution with a conventional screen is not described. The present invention describes how it is possible to embed patterns, which lie below the human threshold of perception but are still recognizable by the objects, into normal screens, when patterns, sensor HW and signal processing are selected appropriately. This is the principle of "watermark embedding".

The published US patent application with the publication number US 2007/0001950 A1 describes a method and a system for presenting a data on a medium for sensing by an input apparatus. The method embeds a symbol design, such as an embedded interaction code (EIC) into an image on a display screen, such as a liquid crystal display (LCD). A grid having a plurality of pixels defines a size of an EIC pattern on an LCD. One area of the grid is used to embed position data and/or metadata information.

It is the object of the present invention to provide an apparatus and a method for determining the position of an object that can cooperate with normal screen hardware or projection hardware, and wherein a pattern used by the apparatus or the method is possibly not or only slightly perceptible by a human viewer.

SUMMARY

According to an embodiment, an apparatus for determining a position of an object relative to a representation of an image to be represented may have: an input for at least one image to be represented; a position pattern generator for generating a position pattern which is subdivided into a plurality of pattern portions, each of the pattern portions having an unambiguous bit pattern of a plurality of bit patterns, the bit patterns being Gray-coded in a generalized manner; a combination unit for combining the position pattern with the at least one image to be represented and for providing a corresponding combined image; an optical sensor for optically sensing an image section of the combined image, the image section being correlated with the position of the object; a filter for extracting at least one bit pattern which corresponds to a pattern portion of the position pattern, from the image section and for providing at least one corresponding extracted pattern portion; determination means for determining the position of the object on the basis of the at least one extracted bit pattern.

According to another embodiment, an image processing apparatus for rendering an image to be represented for determining the position of an object relative to a representation of the image to be represented may have: an input for an image to be represented; a position pattern generator for generating a position pattern which is subdivided into a plurality of pattern portions, each of the pattern portions having an unambiguous bit pattern of a plurality of bit patterns, and the bit patterns being Gray-coded in a generalized manner; and a combination unit for combining the position pattern with the at least one image to be represented and for providing a corresponding combined image.

According to another embodiment, a pattern sensing apparatus may have: an optical sensor for optically sensing an image section of a combined image which includes a combination of an image to be represented and a position pattern; a filter for extracting at least one pattern portion, Gray-coded in a generalized manner, of the position pattern from the image section; a generalized Gray decoder for decoding the pattern portion Gray-coded in a generalized manner and for providing decoded information; and an interface for providing the decoded information or information derived therefrom for subsequently determining the position of the image section relative to a representation of the image to be represented.

According to still another embodiment, a method for determining a position of an object relative to a representation of an image to be represented may have the steps of: generating a position pattern which is subdivided into a plurality of pattern portions, each of the pattern portions having an unambiguous bit pattern of a plurality of bit patterns, the bit patterns being Gray-coded in a generalized manner; combining the position pattern with at least one image to be represented and providing a corresponding combined image; sensing an image section of the combined image, the image section being correlated with the position of the object; extracting at least one pattern portion of the position pattern from the image section and for providing at least one corresponding extracted pattern section; and determining the position of the object on the basis of the at least one extracted pattern portion.

Another embodiment may have a computer program having program code for executing the above method, when the computer program runs on a computer.

According to another embodiment, an apparatus for determining a position of an object within a representation of an image to be represented may have: an input for the image to be represented; a modulation image generator for generating at least one modulation image, the at least one modulation image being subdivided into a plurality of fields and a modulation image value of a certain field representing location information of the field within the modulation image; an image modulator for modulating the image to be represented with the modulation image, a difference between the image to be represented and the image modulated with the at least one modulation image being below a threshold of perception of humans; an output for the image modulated with the at least one modulation image for being displayed on a display apparatus; an optical sensor for sensing an optical sensor emitted from an image section of the image modulated with the modulation image, and for generating a corresponding sense signal; and an evaluation unit for determining image section location information using the optical signal emitted by the image section, by the evaluation unit being configured to extract a piece of location information of at least one field located at least partly within the image section, from the optical signal emitted by the image section.

Thus, several embodiments are based on the fact that, due to the Gray coding or generalized Gray coding, the bit patterns manage with a relatively low number of bits per bit pattern for the different pattern portions to obtain a comparatively fine position resolution. Due to the low bit number it is possible to combine the bits with the image to be represented such that the image to be represented is amended so slightly that it is not perceptible or at least not obvious for a human viewer. For this purpose, the fact that the information to be transmitted for the individual areas or pattern portion is known in advance is utilized. When the information is transmitted by a bit pattern, it is possible, without any functional limitations, to assign bit patterns that are as similar as possible to adjacent areas or pattern portions. As information, image areas transmit X and Y coordinates (in particular their own X and Y coordinates). Two adjacent areas are characterized by the fact that one of these coordinates is increased or decreased by one. If Gray coding is used for assigning the numbers to a bit pattern, the adjacent bit patterns will only differ by a single bit. Then, crosstalk between two areas will have the effect that the symbols for all bits apart from one are superimposed (amplified) constructively, and only a single bit "mixes". Thereby, secure recognition of the common bits is performed and the "mixed bit" even shows that the sensor is between the two areas without extending the encoding of the symbols.

Generalized Gray coding means a Gray code where only one element changes from one pattern portion to an adjacent pattern portion, wherein one element, however, can comprise one bit (i.e. normal Gray code) or more than one bit. According to a definition, generalized Gray codes are codes having both a reflective property and a unit distance property, wherein the unit distance property can be one bit or several bits.

Thus, the bit patterns of adjacent pattern portions or areas practically do not interfere with each other (only in one bit), but on the contrary, amplify each other constructively in most bits. Accordingly, for example, a modulation sequence implementing the combination of the image to be represented with the position pattern can be significantly shorter than in other position determination principles. During crosstalk of adjacent cells, the signal energy of the combination (e.g. in the form of a modulation) can be used in a mostly constructive manner. Further, in adjacent pattern portions (or areas), no sequences that are orthogonal to each other and have the respective necessitated length have to be used. If the sensor senses two (or more) adjacent pattern portions in parts, the signal energy will remain the sum of the sensed sub areas.

When using modulation for combining the image to be represented with the position pattern, the modulation depth can be lowered without increasing the sequence length by spreading in return. In that way, it becomes practicable to constantly embed the modulation in the form of a watermark in an invisible manner into all (or at least some relevant) image areas and to still enable fast position recognition.

According to alternative embodiments, an apparatus for determining a position of an object within a representation of an image to be represented comprises: an input for the image to be represented; a modulation image generator for generating at least one modulation image, wherein the at least one modulation image is subdivided into a plurality of fields and a modulation image value of a specific field represents location information of the field within the modulation image; an image modulator for modulating the image to be represented with the modulation image, wherein a difference between the image to be represented and the image modulated with the at least one modulation image is below a human threshold of perception; an output for the image modulated with the at least one modulation image for display on a display apparatus; an optical sensor for sensing an optical signal emitted by an image portion of the image modulated with the modulation image and for generating a respective sense signal; and an evaluation unit for determining image section location information based on the optical signal emitted by the image section, wherein the evaluation unit is configured to extract location information of at least one field located at least partly within the image section, from the optical signal emitted by the image portion.

BRIEF DESCRIPTION OF THE DRAWINGS

Embodiments of the invention will be discussed in more detail below with reference to the accompanying drawings. They show:

FIG. 3 a schematic representation of a position pattern or modulation image;

FIG. 4 a schematic representation of the position pattern or modulation image of FIG. 3 with two examples of a viewing range of a sensor of the apparatus for determining the position of an object;

DETAILED DESCRIPTION OF THE INVENTION

Before embodiments of the present invention will be discussed in more detail below based on the drawings, it should be noted that identical, functionally identical or equal elements and structures are provided with the same or similar reference numbers in the different figures, such that the description of the elements and structures provided with the same or similar reference numbers in the different embodiments are inter-exchangeable or can be applied to one another.

Figure 1:
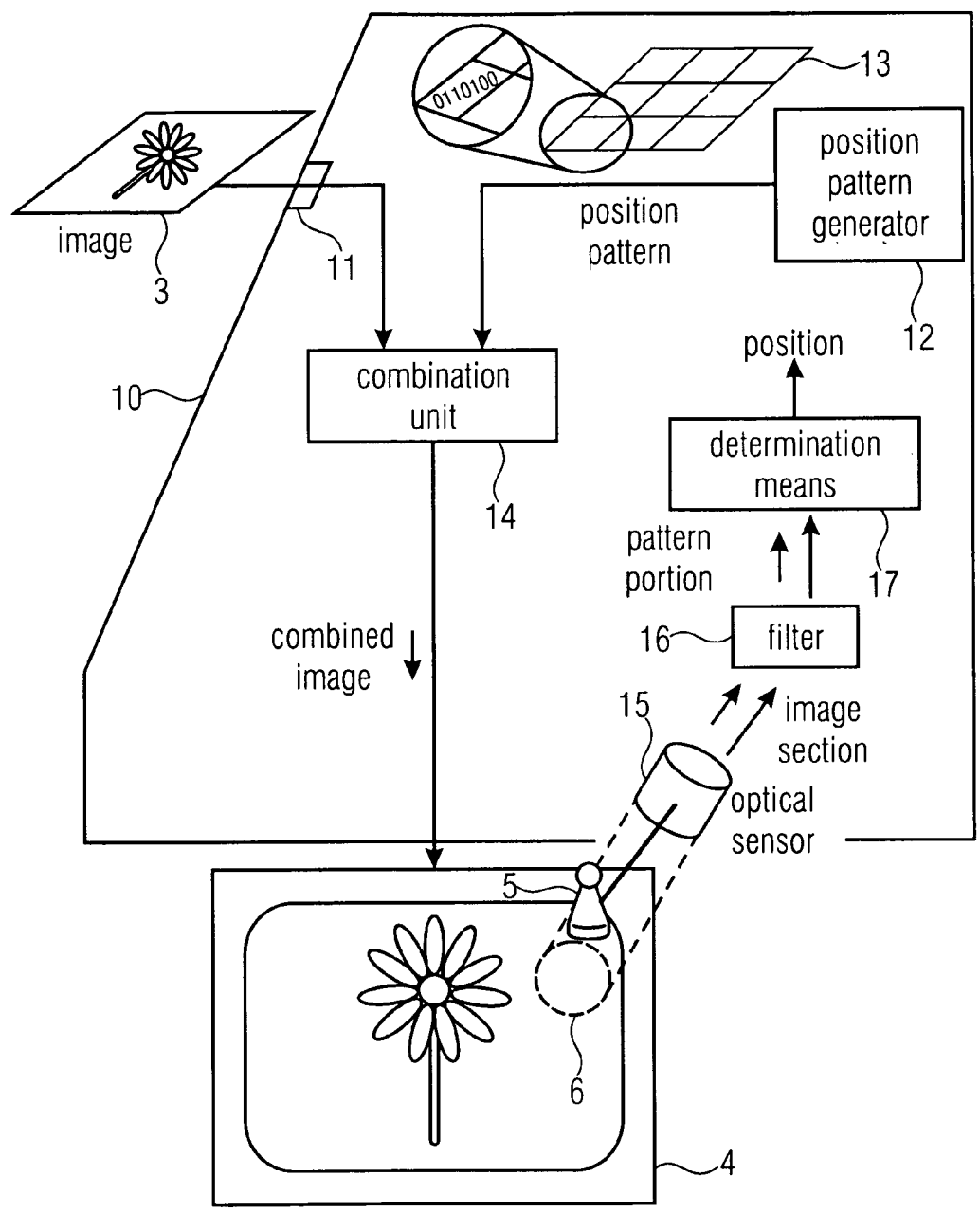
FIG. 1 a schematic block diagram of an apparatus for determining a position of an object according to at least one embodiment of the technical teaching disclosed herein.

FIG. 1 shows a schematic block diagram of an apparatus for determining a position of an object according to at least one possible embodiment of the technical teaching disclosed herein. The apparatus 10 receives an image to be represented 3 (i.e. respective image data) at an input 11. The image to be represented 3 is to be represented by means of a display apparatus 4, wherein the display apparatus 4 can be for example a screen, a digital projector having a respective projection area or another apparatus for representing information in optical form. A movable object 5 can take up a position in relation to the display 4, by putting or placing the object, for example, onto the horizontally oriented display area of the display apparatus 4 and orienting it to a specific image section of the image represented by the display apparatus 4. Generally, however, it is not necessitated that the object 5 is in direct contact with the display apparatus 4, it should merely be clear, for the benefit of an unambiguous or correct position determination of the object, to what image section a current position of the object 5 corresponds. Further, the display area of the display apparatus 4 does not have to be oriented horizontally, but can also be inclined or perpendicular. In these cases it is practical when the object is attached, can be suspended on or placed onto the display surface by suitable measures. Alternatively, the object can also be held or guided by a user. In FIG. 1, the movable object 5 is exemplarily shown as playing piece of a board game but can take on, however, a plurality of other shapes. The image section associated with the position of the object 5 is indicated in FIG. 1 by a dotted circle within the display area of the display apparatus 4.

Normally, the movable object 5 is coupled to an optical sensor 15 such that the same is particularly directed to the mentioned image portion 6. In this way, the optical sensor 15 is configured to sense the image section 6 in an optical manner. Here, the image section 6 corresponds to the position of the object 5. For that purpose, the optical sensor 15 can be integrated into the object 5 or mounted on the same. The optical sensor 15 is part of the apparatus 10 for determining the position of the object 5. An image portion sensed by the optical sensor 15 is transmitted to a filter 16. The filter 16 is configured to filter out one bit pattern or several bit patterns including position information of the image section from the image section. The bit pattern or the several bit patterns are represented by information that has been combined with the image to be represented 3, before the image to be represented 3 is represented by means of the display apparatus 4. When the filter 16 recognizes a bit pattern serving for position determination within the image section with sufficient reliability, it transmits the bit pattern or a respective pattern portion to a determination means 17 of the apparatus 10. The determination means 17 is configured to determine the position of the object 5 based on the at least one extracted pattern portion or the respective bit pattern.

For combining the image to be represented 3 with the information used for position determination, the apparatus 10 for determining the position of the object 5 includes a position pattern generator 12 and a combination unit 14. The position pattern generator 12 provides a position pattern 13. The position pattern 13 is divided into a plurality of pattern portions. Each of the pattern portions comprises an unambiguous bit pattern of a plurality of bit patterns allowing identification of the respective pattern portion. The bit patterns are Gray-coded or generalized Gray-coded. The position pattern is typically a two-dimensional pattern and the pattern portions typically form a two-dimensional array. According to the Gray code, the bit patterns differ from two adjacent pattern portions by only one bit. In a two-dimensional array of pattern portions, it can be useful to use individual Gray coding for each coordinate, which are stored in two separate parts of the respective bit patterns. Even with such Gray coding that is separated by coordinates, the condition that only one bit changes from one pattern portion to an adjacent pattern portion is still fulfilled (wherein pattern portions arranged diagonally to each another are typically not considered as adjacent pattern portions). In the generalized Gray code, one bit or also several bits can change from one to the next pattern portion. In the generalized Gray code, the condition known from the normal Gray code is generalized such that only one element (e.g. a subset of the bit pattern having several bits) changes from one pattern portion to an adjacent pattern portion.

The image to be represented 3 and the position pattern 13 are combined by means of the combination unit 14, such that a respective combined image results, which is provided for display on the display apparatus 4.

The optical sensor 15 can be connected to the filter 16, for example, via a flexible cable or a wireless link (radio link, infrared link, ultrasonic link or the same). In that way, the optical sensor 15 is movable with respect to the rest of the apparatus 10. Alternatively, the flexible cable or the wireless link can also be provided between the filter 16 and the determination means 17, or also at the output of the determination means 17 where the position information is provided.

Figure 2:
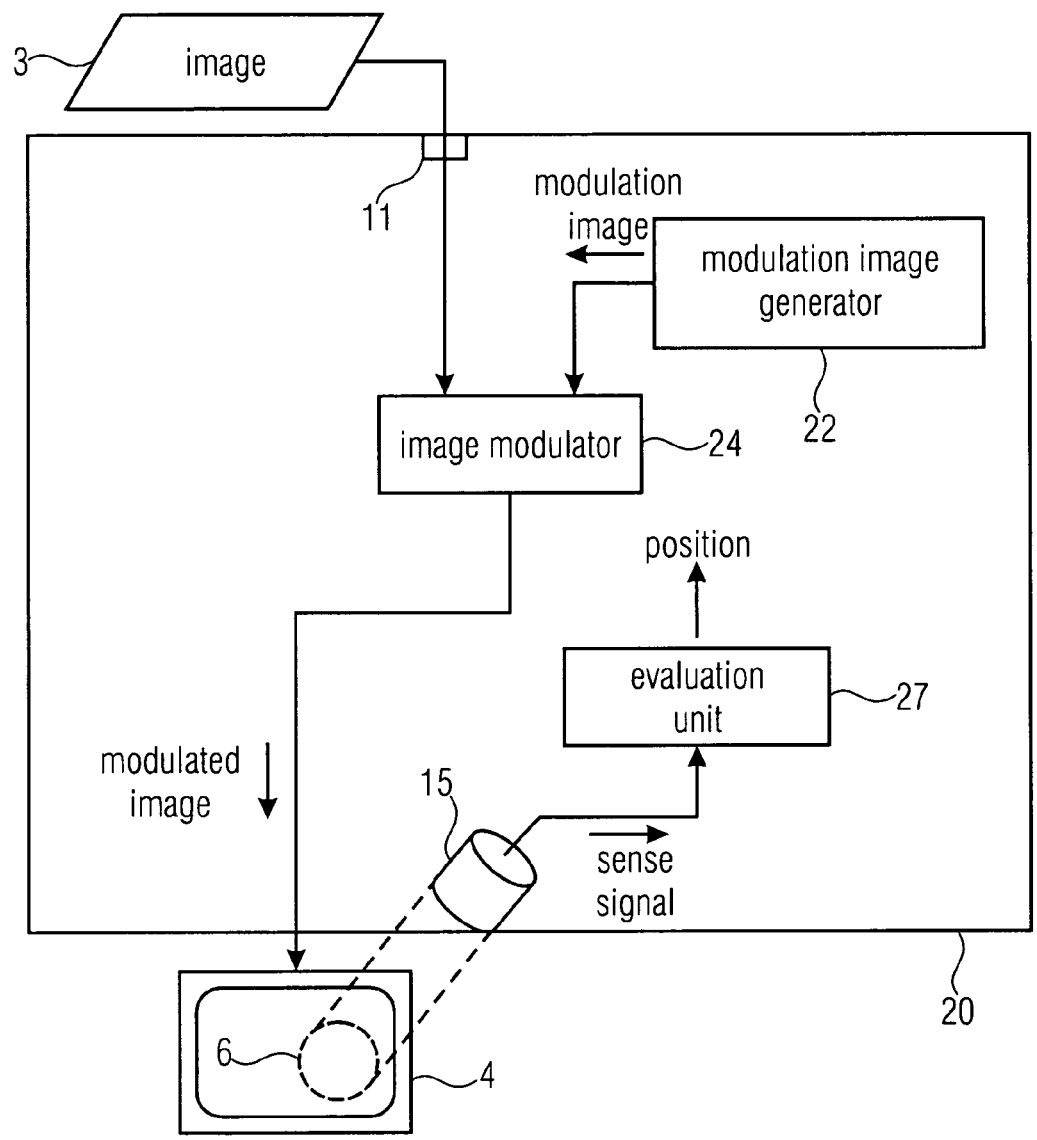
FIG. 2 a schematic block diagram of an apparatus for determining a position of an object according to at least one further embodiment of the technical teaching disclosed herein.

FIG. 2 shows a schematic block diagram of an apparatus for determining a position of an object according to at least one further possible embodiment of the technical teaching disclosed herein. The apparatus 20 includes an input 11 for the image to be represented 3, a modulation image generator 22, an image modulator 24, an optical sensor 15 and an evaluation unit 27. The image to be represented 3 will be passed on within the apparatus 20 from the input 11 to an input of the image modulator 24. A further input of the image modulator 24 is connected to an output of the modulation image generator 22. The modulation image generator 22 generates at least one modulation image divided into a plurality of fields. Here, a modulation image value of a specific field represents location information of the field within the modulation image. The modulation image has a similar purpose as the position pattern of the embodiment illustrated in FIG. 1 and might even correspond to the same. Analogously, the plurality of fields has a similar purpose as the plurality of pattern portions of the embodiment of FIG. 1. Further, with regard to function and/or purpose, the modulation image value of a specific field can also be compared to the unambiguous bit pattern of a specific pattern portion mentioned in connection with the description of FIG. 1.

The image modulator 24 is configured to modulate the image to be represented 3 with the modulation image. The image to be represented 3 can be considered as carrier signal and the modulation image as useful information, wherein the term "useful information" is directed to the purpose of position determination. By modulating, the image to be represented 3 is slightly changed, without a viewer of the modulated image displayed by the display apparatus 4 perceiving a noticeable or spurious effect. Thus, the difference between the image to be represented 3 and the modulated image is below an (average) human threshold of perception. In that way, the modulation image is practically invisible for the human viewer, while it is still displayed in the visible wavelength range. It is desirable that the display apparatus 4 is a standard display apparatus implemented for image reproduction in the visible wavelength range and does not include any means by which a defined input signal can be reproduced in a non-visible wavelength range (e.g. in the infrared range or ultraviolet range). The desire or necessity of being able to represent the modulation image necessitated for position determination also in the visible wavelength range results due to this limitation of the usable wavelength range specified by the display apparatus 4.

The optical sensor 15 senses an optical signal emitted by an image section of the image modulated by the modulation image and generates a respective sense signal. The image section sensing the optical signal correlates with the position of the object. As described in the context of FIG. 1, for that purpose, the optical sensor 15 can be coupled mechanically to the object, for example in that the optical sensor 15 is integrated in the object or mounted on the same. It is also possible that the optical sensor 15 itself represents the object. By means of the evaluation unit 27, image section location information can be determined. For this purpose, the evaluation unit extracts location information from at least one field located at least partly within the image section from the optical signal emitted by the image section. For that purpose, the evaluation unit can include a demodulator that is configured to demodulate the sense signal and to determine a modulation signal possibly included in the sense signal for the at least one field (which is located at least partly within the image section). The location information of the field or the fields located within the image section result from the modulation signal determined by the demodulator.

For extracting location information from the optical signal, the fact that modulating is performed with defined parameters can be utilized. The defined modulation parameters can be known both to the image modulator 24 and the evaluation unit 27. Modulating can be performed, for example, with a predefined temporal frequency or spatial frequency. Since the modulation is to change the image to be represented only insofar as a resulting difference remains below the human threshold of perception, limiting the amplitude range used by the modulation can also be used as parameter supporting the differentiation. Below the amplitude of modulation can mean, for example, a brightness change or intensity change either of the whole image to be represented 3 or a color channel thereof caused by modulation. In other words, modulating the image to be represented with the modulation image can comprise an amplitude range and the evaluation unit can include an amplitude-sensitive filter. The amplitude-sensitive filter can be configured to recognize and possibly extract a temporal change and/or local change of the modulation image value that an amplitude has within the limited amplitude range. However, noise influences or changes of the image to be represented 3 can also cause respective temporal changes and/or local changes of the modulation image value, wherein these, however, normally form no valid location information due to their randomness and in that way can be rejected in the further course of signal processing. When using several sensors or a sensor with several pixels sensing, for example, one pixel of a group of adjacent pixels for which typically the same modulation image value applies (exception: sensor 15 is on a border between two fields of the modulation image) there is the option of cross-checking and/or matching of the modulation image values sensed by the individual sensors/sensor pixels in order to reach, despite the noise influences and the differences within the image to be represented, a relatively reliable determination of the modulation image value in the area viewed by the sensor 15.

The modulation changes the image to be represented 3 at a pixel starting from the actual value (e.g. brightness (color channel) intensity, etc.), wherein this actual value is, however, generally not known since it is not known in advance what image section 6 the optical sensor 15 senses, and since the image to be represented 3 can also change dynamically, in particular when it is a TV image, a video image, an animation or the graphical version of a computer game or computer-aided game. Under the assumption that the image to be represented 3, however, is, at least periodically, sufficiently constant within the sensed image section 3, the image modulator 24 can interrupt modulation, for example at regular intervals, and hence transmit the image to be represented to the display apparatus 4. Information stating that only the image to be represented 3 is displayed or has been displayed in the subsequent or previous time interval can be transmitted to the evaluation unit 27 by means of a specific preceding or subsequent bit pattern. The evaluation unit 27 can hence use the respective sense signal as reference value and in that way the same can determine the location information more reliably and/or efficiently.

In the embodiment shown in FIG. 2, the location information included in the modulation image can also be Gray-coded with respect to adjacent fields. The evaluation unit can be configured to evaluate extracted location information that is cannot be clearly allocated to a field, by evaluating relatively unambiguous bit values of bits of the (Gray-coded) location information for delimiting a spatial area where the image section is located. Further, relatively indifferent or uncertain bit values of bits of the (Gray-coded) location information can indicate that the image section overlaps at least two fields of the modulation image. By exemplarily assuming that the bits are binary bits and can assume two bit values represented by "0" or "1", a bit value lying between 0 and 1 can also result for one or several bits of the location information, in particular when two or more fields of the modulation image are included at least partly in the image section (overlapping or simultaneous presence of at least two fields of the modulation image). The process of sensing the optical signal can be seen, at least in some embodiments of the technical teaching disclosed herein, as analogous process, where characteristics, intensity, color combination and others of the optical signal transmitted by the image section are sensed. The differentiation between relatively unambiguous bit values and relatively uncertain bit values can be performed, for example, by means of two thresholds, wherein a first threshold is, for example, at 0.1 and a second threshold at, for example, 0.9. For a bit value lying in the interval [0; 0.1], it can be assumed that it is a relatively unambiguous bit value, namely "0". Also, for a bit value between 0.9 and 1, it can be assumed that it is the relatively unambiguous bit value "1". If, however, the bit value lies in the interval [0.1; 0.9] (excluding the interval limits), no unambiguous statements on the bit value can be made, such that the respective bit value is classified as relatively indifferent or uncertain. As mentioned above, the stated threshold 0.1 and 0.9 are to be seen as examples and other thresholds are also possible, for example 0.15 or 0.2 or 0.25 for the bottom threshold as well as 0.75 or 0.8 or 0.85 for the top threshold. A relatively indifferent or uncertain bit value can be caused in particular by the fact that not only one field of the modulation image is included in the image section sensed by the image sensor, but that the image section includes two or more fields in varying (area) proportions. A bit value lying between the bottom threshold and the top threshold indicates that the image section is located on the border between two or more fields of the modulation pattern. In a way, the sense signal can be considered, at least in some embodiments, as a "fuzzy logic" signal, which is evaluated by the evaluation unit 27 to determine probabilities or proportions of fields of the modulation image included in the image section. In that sense, the apparatus for determining a position of an object within a display of an image to be represented can include fuzzy logic configured to evaluate a sense signal provided by the optical sensor 15 and to state what field of the modulation pattern or what fields of the modulation pattern are included in the image section to approximately what proportion.

It would be desirable to allow simultaneous fast recognition of several objects at arbitrary screen positions, scalable location resolution and constructive handling of interchannel interferences in a position determination apparatus or a position determination method. In a possible embodiment of the apparatus for determining a position, the optical sensor, typically coupled to the object, has only few light sensors, each sensing a small area of the screen of, for example 1 or 2 $nm^2$ area as a point (either only as a brightness value or as three brightnesses of the colors red, green and blue or as another characteristic of the optical signal emitted by the image section). By temporal modulation of subsequent images, a temporal pattern is transmitted in each of the small screen areas. These patterns include temporal synchronization information, an X coordinate and an X coordinate of the respective area.

Typically, it cannot be avoided that the object or the optical sensor can be in the border area between two (or even more) areas, such that the patterns of these areas overlap on the sensor. Crosstalk between the patterns of adjacent image areas occurs, which results in an interference of the patterns (interchannel interference, ICI) which can make it difficult or impossible to recognize the patterns (in particular in position determination technologies that do not apply the technical teaching disclosed herein). A common procedure in message transmission would be to use orthogonal sequences for modulation for the patterns in the adjacent channels, which can even be recognized during interference between the symbols. The disadvantage is that the time necessitated for transmission has to be prolonged, i.e., the information can be transmitted less frequently.

The technical teaching disclosed herein describes an alternative option offering several advantages. For this, the fact is used that the information to be transmitted for the individual areas is known in advance. When the information is transmitted by a bit pattern, it is possible, without any functional limitations, to assign bit patterns, which are as similar as possible, to adjacent areas. Image areas transmit an X and a Y coordinate as information, two adjacent areas are characterized, for example, in that one of these coordinates is increased or decreased by 1. If Gray coding is used for assigning the numbers to a bit pattern, the adjacent bit patterns only differ in a single bit (or in several bits for a generalized Gray code). Then, crosstalk between two areas has the effect that the symbols for all bits are superimposed (amplified) constructively on one bit and only a single bit "mixes". This results in secure recognition of the common bits and the "mixed bit" even shows that the sensor is between the two areas without extending the encoding of the symbols. While when using orthogonal sequences, the signal becomes weaker in any case, for example when two channels are mixed with half the energy, here, no attenuation of the signal occurs for the common bits.

This method even works when several adjacent areas overlap, for example when the sensor senses an image area where several areas are located simultaneously. In this case, as many bits as corresponding to the size of the area mix, all other bits amplify constructively, since the same are identical for all symbols. In that way, it is possible to divide the screen into very small areas and to determine the local position of the objects with one and the same screen modulation more or less accurately, depending on the size of the screen area, which is sensed by the sensor of the object. Thus, the position resolution can be scaled easily.

If numbering is performed by (x, y) coordinate pairs in columns and rows, the y values of adjacent areas have the same values in the x direction, and the x values have the same value in the y direction. This acts as further constructive crosstalk when the respective two areas overlap at the sensor. Without limiting the advantages of the method, the three components synch, X and Y coordinates can be divided onto three channels transmitted in parallel, e.g. the blue, red and green color information. For this case, a RGB sensor is used in the object.

As one example, FIG. 3 shows a possible position pattern or a possible modulation image. The position pattern or modulation image can be extended to the bottom and to the right. The letters B, R and G stand for color channels blue, red and green. A synchronization signal is transmitted by means of the blue color channel. The synchronization signal can, for example, be a periodic modulation pattern within the blue color channel that can be recognized by the evaluation means or determination means. The X coordinate of the respective pattern portion of the position pattern or the field of the modulation image is transmitted by means of the red color channel. The Y coordinate of the pattern portion or field is transmitted via the green color channel.

The screen is divided into a matrix of small areas of, for example, 1*1 mm$^2$. The areas are numbered in x and y direction, an area is unambiguously identified by a value pair (x, y). Each of the areas is to be provided with a modulation transmitting the coordinates (x, y) of the area.

The numbers X and Y are Gray-coded, such that the values for adjacent image areas differ by exactly 1 bit. X and Y are now transmitted in a sequential manner, wherein the transmission is synchronized in all areas, i.e. for all areas, the "first" bit of the x or y coordinate is transmitted at the same time. For synchronizing the receiver with the transmitter, a separate synchronization pattern is transmitted. The transmission of the 3 parts synchronization, x and y can be performed sequentially, it can be placed, however, also on the three color channels red, green and blue. In the latter case, transmission of synchronization, X coordinate and Y coordinate takes place simultaneously as will be illustrated schematically in the following figure.

FIG. 4 shows two examples of the effects when subareas overlap on the sensor. The viewing range of the sensor (i.e. the sensed image section) for the two examples is here represented as a circle labelled "sensor 1" or "sensor 2".

In the case of sensor 1, the sensor is located exactly between four areas. The proportions of the four areas mix to the same extent, i.e. the bit of the X or Y coordinate changing from one area to the adjacent one will assume an intermediate value, the other bits are unambiguous as illustrated in the following table.

|  | blue = synch | red = x | green = y |
| --- | --- | --- | --- |
| area (R = 0, G = 1), 25% | abcd | 0; 0; 0; 0 | 0; 0; 0; 1 |
| area (R = 1, G = 1), 25% | abcd | 0; 0; 0; 1 | 0; 0; 0; 1 |
| area (R = 0, G = 2), 25% | abcd | 0; 0; 0; 0 | 0; 0; 1; 1 |
| area (R = 1, G = 2), 25% | abcd | 0; 0; 0; 1 | 0; 0; 1; 1 |
| weighted sum | abcd | 0; 0; 0; 0.5 | 0; 0; 0.5; 1 |

Each of the four areas occupies a quarter of the area of the viewing range of the optical sensor 15.

In the case "sensor 2", the sensor is located exactly in the center over one area. This fully sensed area provides the largest contribution, the other four areas only, for example, 10% (even smaller areas are neglected). This can be presented as follows in a table.

|  | blue = synch | red = x | green = y |
| --- | --- | --- | --- |
| area (R = 3, G = 0), 10% | abcd | 0; 0; 1; 0 | 0; 0; 0; 0 |
| area (R = 2, G = 1), 10% | abcd | 0; 0; 1; 1 | 0; 0; 0; 1 |
| area (R = 3, G = 1), 60% | abcd | 0; 0; 1; 0 | 0; 0; 0; 1 |
| area (R = 4, G = 1), 10% | abcd | 0; 1; 1; 0 | 0; 0; 0; 1 |
| area (R = 3, G = 2), 10% | abcd | 0; 0; 1; 0 | 0; 0; 1; 1 |
| weighted sum | abcd | 0 0, 1 1 0.1 | 0 0 0.1 0.9 |

In X and Y direction, three areas are affected, i.e. two bit junctions. The bit state of the central area is represented the most, the bit of the adjacent area contributes with its proportion. In that way, the result becomes less sharp, but with sufficiently good signal quality, it can still be implied which area is located in the center. Here, Gray coding allows soft crossfading between two adjacent areas.

Thus, since the modulations of adjacent areas do not interfere but, on the contrary, amplify each other constructively, modulation sequences in adjacent areas that are orthogonal to each other can be omitted. Accordingly, the modulation sequence is significantly shorter. All in all, the gained signal is amplified, since not only a subarea with its orthogonal sequence provides the signal energy, but all visible subareas. In that way, the modulation depth at fine resolution (small areas) can be reduced so far that the same remains below the human threshold of perception.

Since the modulation is a superposition of the background image and the absolute level of the background is not known during detection, it can be useful that a change between a modulated "0" or "1" takes place frequently enough, since otherwise 0 cannot be differentiated from 1. For that purpose, for example, Manchester encoding can be used, which replaces each bit of the Gray code by a sequence (1,0) or (0,1). By this differential encoding, the decoder can form the difference between two subsequent images to recognize the transition of the modulation from 0 to 1 or from 1 to 0. The absolute brightness level is generally insignificant. Alternatively, this type of Manchester encoding can also be used every n bits or pilot cells can be integrated at suitable intervals.

In summary, the present invention differs from the known technology in at least some of the following points:

The signal energy of modulation of adjacent cells can be mostly utilized in a constructive manner during crosstalk, no orthogonal sequences in adjacent areas have to be used. If the sensor senses two (or more) adjacent areas in parts, the signal energy remains the sum of the sensed subareas.

The system can still operate when the area sensed by the sensor includes several of the modulated areas. The system is scalable within the area, i.e. it can work on larger and smaller screens for the same number of image areas.

The modulation depth can be lowered without having to increase the sequence length by spreading in return. In that way, it becomes practical to constantly embed the modulation in the form of a watermark in an invisible manner into all image areas and to still allow fast position recognition.

Figure 5:
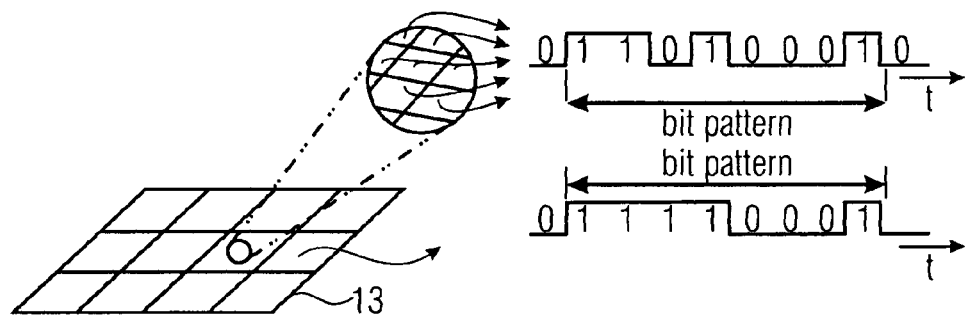
FIG. 5 a schematic illustration of a temporal bit pattern.

FIG. 5 illustrates a position pattern 13 or modulation image that can be used for temporal modulation of the image to be represented 3. The position pattern 13 is divided into several pattern portions, wherein each pattern portion includes a pixel or a plurality of pixels. As one example, a section of a pattern portion is represented in an enlarged manner. Since all pixels belonging to that section belong to the same pattern portion, they all follow the same temporal bit pattern. The temporal bit pattern illustrated in FIG. 5 exemplarily includes eight bits. As a comparison, a further bit pattern is illustrated in FIG. 5, which belongs to a pattern portion adjacent to the right within the position pattern 13. Since this is an adjacent pattern portion, the bit patterns differ, according to the Gray coding, in only one bit, here the third bit.

Figure 6:
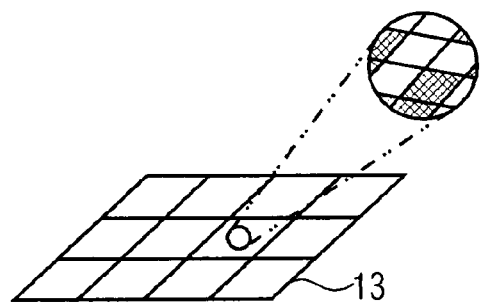
FIG. 6 a schematic illustration of a spatial bit pattern.

FIG. 6 illustrates a spatial bit pattern that can occur within a pattern portion. The spatial bit pattern can be, for example, a 3×3 matrix or a 4×4 matrix (generally m×n matrix) and can possibly repeat within the respective pattern portion. In that case, the optical sensor 15 includes also a matrix of pixels including at least as many pixels as the spatial bit pattern.

Figure 7:
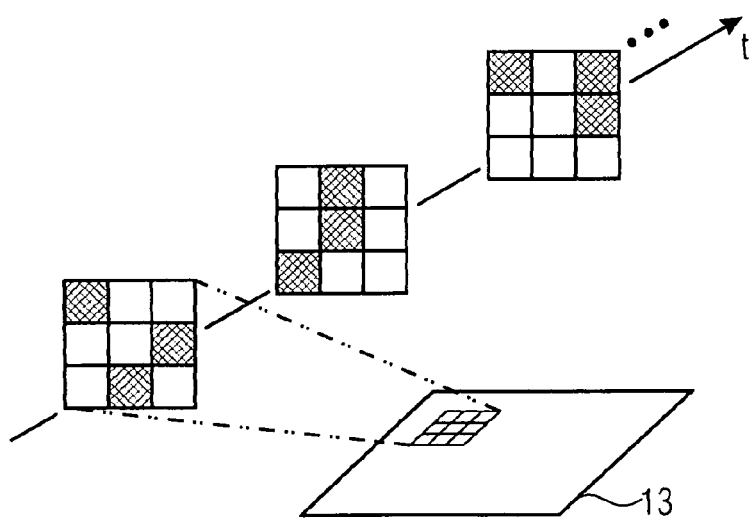
FIG. 7 a schematic illustration of a temporal spatial bit pattern.

FIG. 7 illustrates a temporal spatial bit pattern where the individual pixels of an array of pixels changes according to a specific temporal pattern.

For the temporal bit pattern of FIG. 5, the spatial bit pattern of FIG. 6 and the temporal spatial bit pattern of FIG. 7 it applies additionally that the location information can also be divided onto the different color channels of a colored display of the image to be represented.

Figure 8:
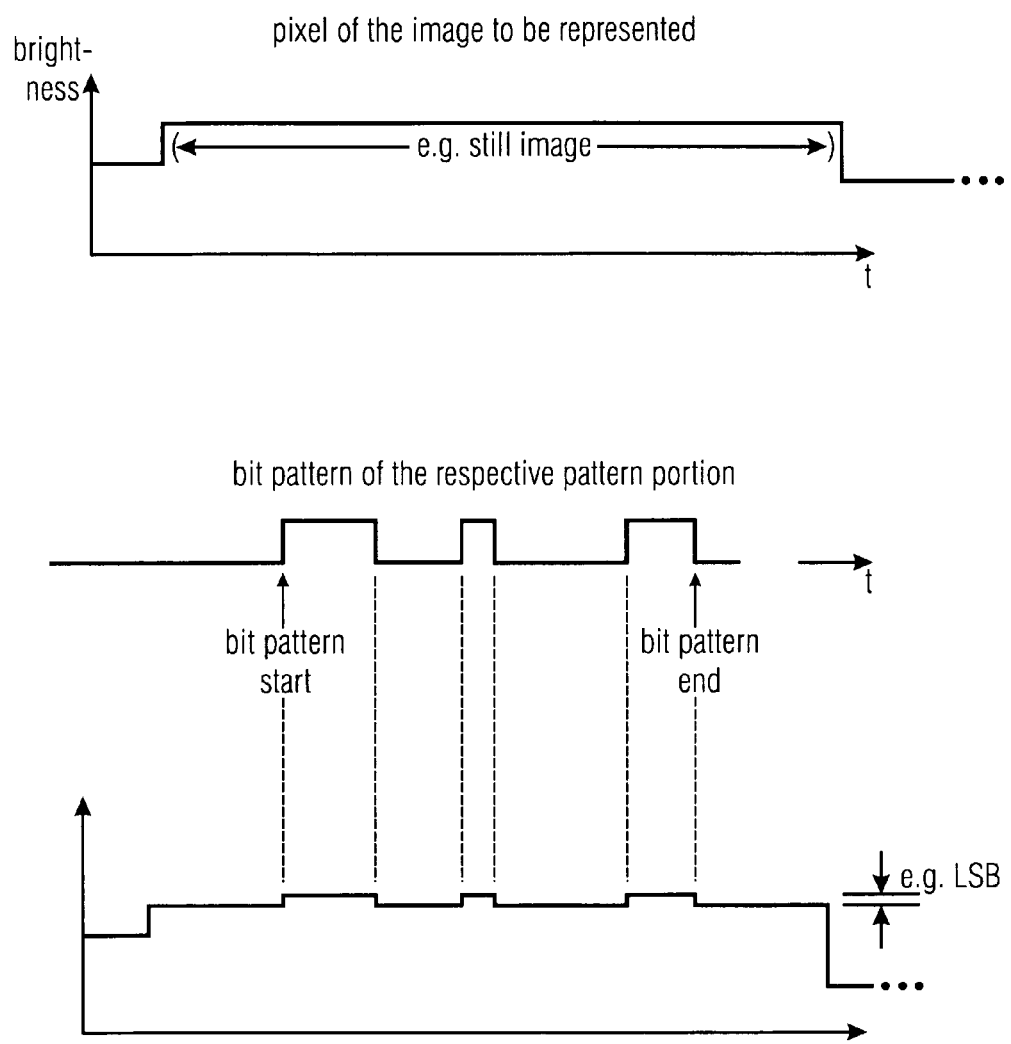
FIG. 8 a schematic illustration of a temporal modulation of a pixel value based on temporal waveforms.

FIG. 8 illustrates a principle for modulating the image to be represented 3 with the position pattern or the modulation image. A top time diagram in FIG. 8 represents schematically the brightness curve of a pixel of the image to be represented 3 over time. For simplicity reasons, it is assumed that the brightness value for this pixel remains constant within a specific time interval, for example since the image to be represented 3 is a still image during this time interval. Generally, it is not necessitated that the image to be represented is a still image. Rather, dynamic images, such as a TV image or a video encoded image can also be used, where the brightness value normally changes constantly. Further, it should be noted that the brightness value is to be considered only as one example for an image characteristic of the image to be represented and that other image characteristics can also be used.

In the middle, FIG. 8 shows a bit pattern of a pattern portion corresponding to the above-mentioned pixel of the image to be represented, i.e. the pattern portion is associated with an area of the image to be represented where the mentioned pixel is located. The bit pattern is a binary temporal pattern extending between a bit pattern start and a bit pattern end.

Modulating the image to be represented with the position pattern or the modulation image results in a brightness curve illustrated schematically in a bottom time diagram of FIG. 8. The bit pattern of the pattern portion results in a change of the brightness value of the pixel, wherein an amplitude of the brightness change corresponds, for example, to a least significant bit (LSB). For example, the brightness information of the pixel or the intensity information of a color channel of the pixel can comprise a resolution of 256 different brightness or intensity stages. When the amplitude of the modulation corresponds to the least significant bit LSB, the ratio between modulation amplitude and bit resolution of the image to be represented or a color channel of the same is approximately 0.4%. Such a small modulation with respect to the whole bit resolution of the image to be represented is typically not perceptible by a human viewer. It can even be that even values of 10% for the ratio between modulation amplitude and bit resolution are still below the human threshold of perception, in particular when the modulation is distributed temporally and/or spatially, such that it is not or only hardly perceptible for the human viewer. Further possible values for the ratio between modulation amplitude and brightness or intensity resolution (the so-called "modulation depth") are 5%, 3%, 2% and 1%.

The combination unit 14 or the image modulator 24 can be configured to keep the image to be represented 3 temporarily constant, i.e. to "freeze" the same to generate a still image in that manner and to improve the recognition of the position pattern by the determination means 17 or the evaluation unit 27.

Figure 9:
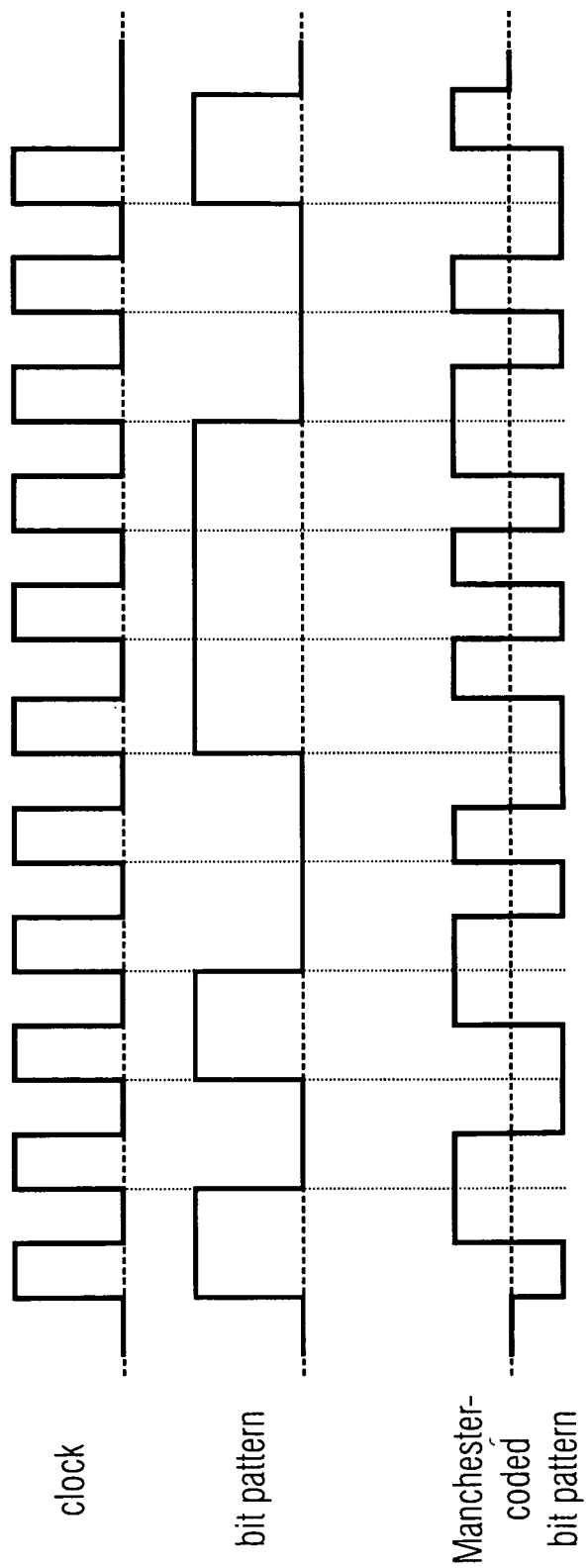
FIG. 9 a schematic illustration of temporal waveforms for illustrating Manchester encoding.

FIG. 9 schematically presents a conversion of a temporal bit pattern into a Manchester-encoded bit pattern. The Manchester-encoded bit pattern can be obtained, for example, by XORing a clock signal with the bit pattern. In other words, the bit pattern modulates the phase position of a clock signal in a binary manner. A further possible interpretation of the Manchester code is that the edges of the Manchester-encoded bit pattern, in relation to the clock signal, carry the information. According to the code definition of IEEE 802.3, used in FIG. 9, a falling edge means logic 0 and a rising edge logic 1. Thus, in that case, there is at least one edge per bit from which the clock signal can be derived. The Manchester code is self-synchronizing and independent of the DC voltage level. As already mentioned above, the transition of the modulation from 0 to 1 or from 1 to 0 can be recognized, independent of a current absolute brightness value of the image to be represented or a pixel thereof.

Figure 10:
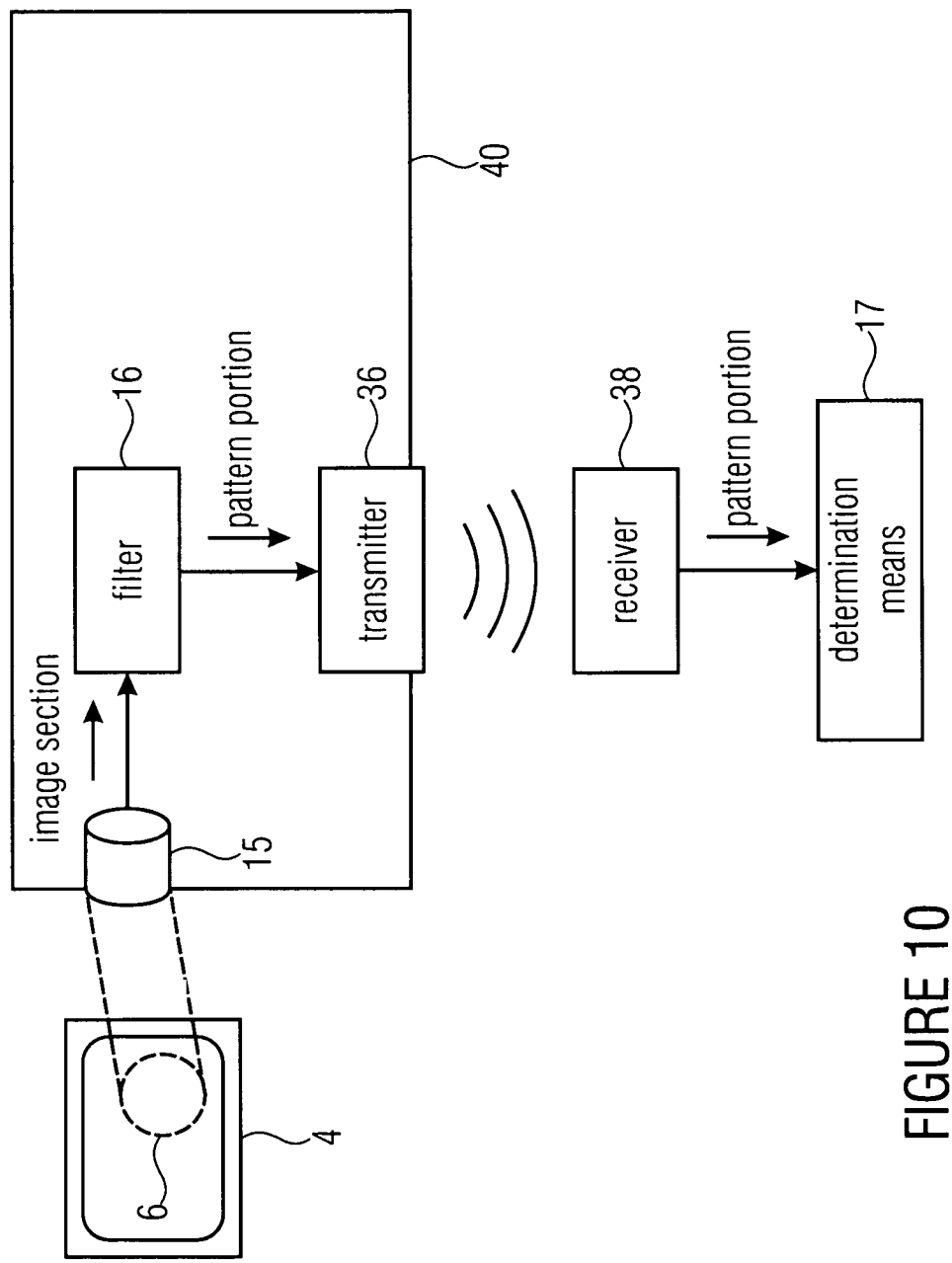
FIG. 10 a schematic block diagram of an apparatus for determining the position of an object according to at least one further embodiment.

FIG. 10 shows a schematic block diagram of an apparatus for determining a position of an object according to a further embodiment of the technical teaching disclosed herein. The apparatus for determining the position includes a first separate unit 14 which again includes the optical sensor 15, the filter 16 and a transmitter 36. The separate unit 14 is independent with respect to a further possible separate unit including the determination means and a receiver 38. The transmitter 36 is configured to transmit object position data or intermediate data necessitated for determining the position of the object. Hence, intermediate data are data that occur within information transmission from the optical sensor to the determination means 17. In particular, the separate unit 40 can be coupled to the object 5 or integrated into the same. In that way, the object can be moved together with the separate unit 40 with respect to the representation of the image to be represented by means of the display apparatus 4. The receiver 38 and the determination means 17 can be relatively stationary with respect to the display apparatus and/or a computer system connected thereto (image data source (e.g. DVD player, video recorder, TV receiver, etc.)). Transmitting the object position data or intermediate data from the transmitter 36 to the receiver 38 can be performed, for example, based on radio signals, infrared signals, ultrasound signals or further possible transmission technologies.

Figure 11:
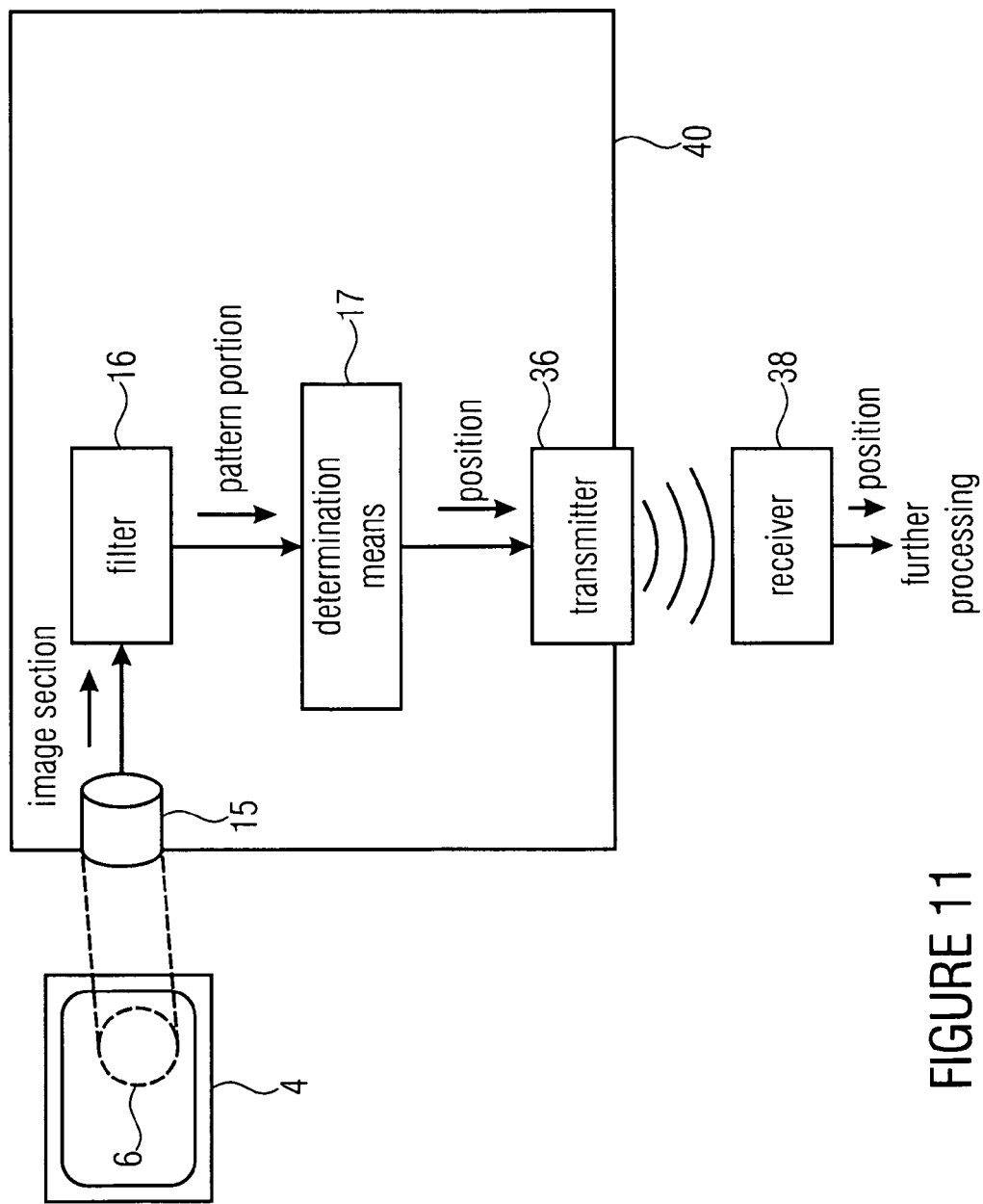
FIG. 11 a schematic block diagram of an apparatus for determining the position of an object according to at least one further embodiment.

FIG. 11 shows a schematic block diagram of an apparatus for determining the position of an object which is structured similarly to the apparatus according to the embodiment shown in FIG. 10. In the embodiment shown in FIG. 11, the first separate unit 14 also includes the determination means 17, such that the position data can be detected within the separate unit 40. Thus, the transmitter 36 transmits the position data to the receiver 38 which provides the same for further processing, for example, to a computer system, another system or a graphical user interface.

Figure 12:
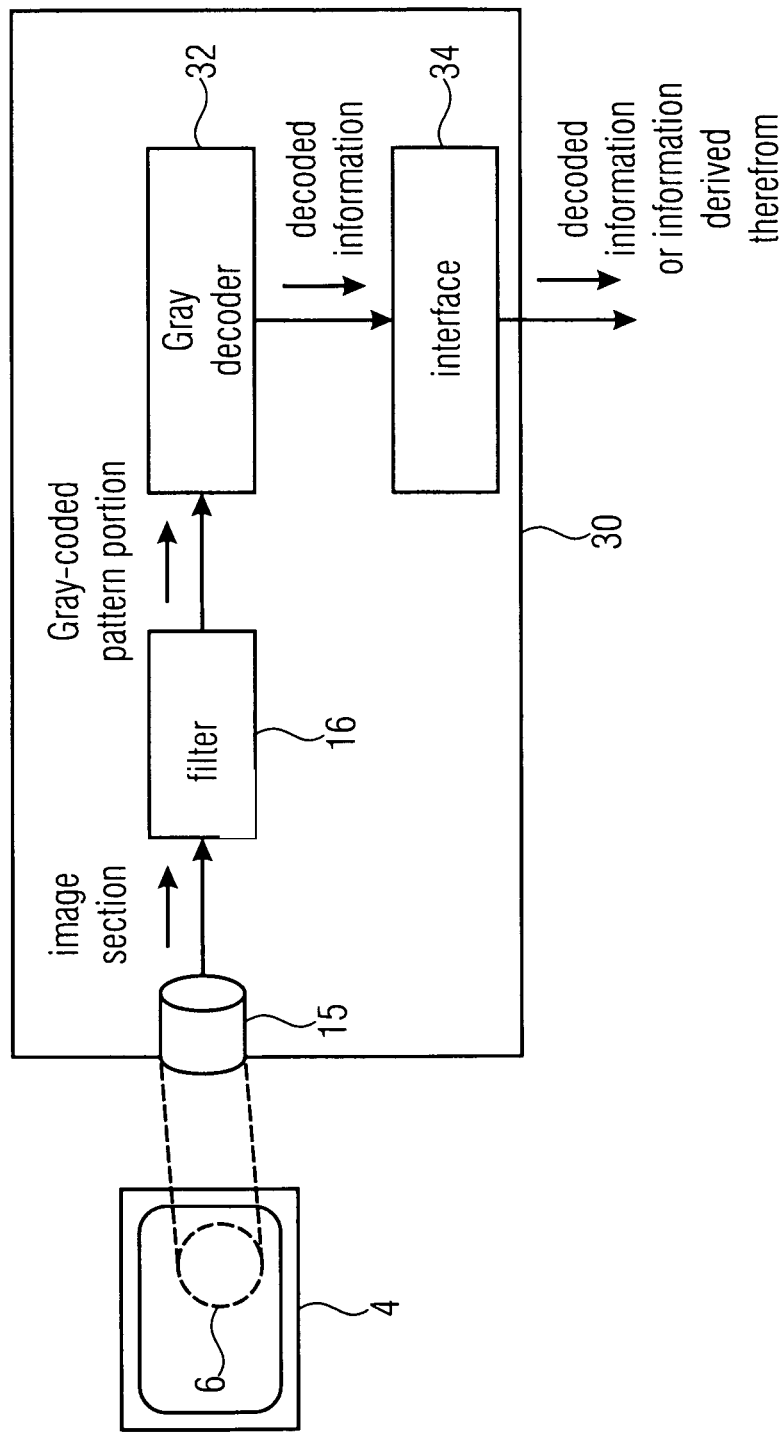
FIG. 12 a schematic block diagram of a pattern sensing apparatus according to at least one embodiment of the technical teaching disclosed herein.

FIG. 12 shows a schematic block diagram of the display apparatus 4 and a pattern sensing apparatus 30 in accordance with another embodiment of the technical teaching disclosed herein. The pattern sensing apparatus 30 includes the optical sensor 15, the filter 16, a Gray decoder 32 and an interface 34. Similarly to what has been described in connection with the apparatus for determining the position of the object, the optical sensor 15 is configured for optically sensing an image section 6 of a combined image which includes a combination of an image to be represented and a position pattern. The image section or data describing the image section is/are transmitted from the optical sensor 15 to the filter 16. The filter 16 is configured for extracting at least one Gray-coded pattern portion of the position pattern from the image portion 6 or the corresponding image portion information. The Gray decoder 32 is configured for decoding the Gray-coded pattern portion and for providing decoded information. The filter 16 and the Gray decoder 32 may also cooperate or be integrated into a single unit since extracting the at least one Gray-coded pattern portion may profit from information detected in connection with decoding the Gray-coded pattern portion, or the decoded information at the output of the Gray decoder 32. The decoded information is passed on from the Gray decoder 32 to the interface 32 which provides same or information derived therefrom for further processing outside the pattern sensing apparatus 30. The pattern sensing apparatus 30 may exemplarily be used similarly to the first separate unit 40 having been illustrated and described in FIGS. 10 and 11. Thus, the pattern sensing apparatus 30 may be coupled to the object 5 or be integrated into it in order to allow positional sensing for the object 5. The interface 34 may be a radio transmitter, an infrared transmitter, an ultrasonic transmitter, a cable connection or a different suitable interface for transmitting information to an external receiver.

A position pattern part in the combined image may be selected such that it is below the threshold of perception of humans. In addition, the position pattern part may exhibit defined characteristics relating to an amplitude, color information, spatial frequency and/or temporal frequency. The filter 16 may be configured to extract image parts from the combined image, which correspond to the defined characteristics of the position pattern part. In particular, the position pattern part in the combined image may be a slight modulation of the image to be represented (such as, for example, temporal modulation, spatial modulation or temporal-spatial modulation) such that the position pattern part has only a limited amplitude, exemplarily with regard to a brightness value or intensity value.

When the combined image is based on a modulation of the image to be represented and the position pattern, filter 16 may include a demodulator for demodulating the combined image.

The position pattern may contain at least one piece of temporal synchronization information and the pattern sensing means may include synchronizing means for synchronizing the pattern sensing means 30 on the basis of the synchronization information.

Figure 13:
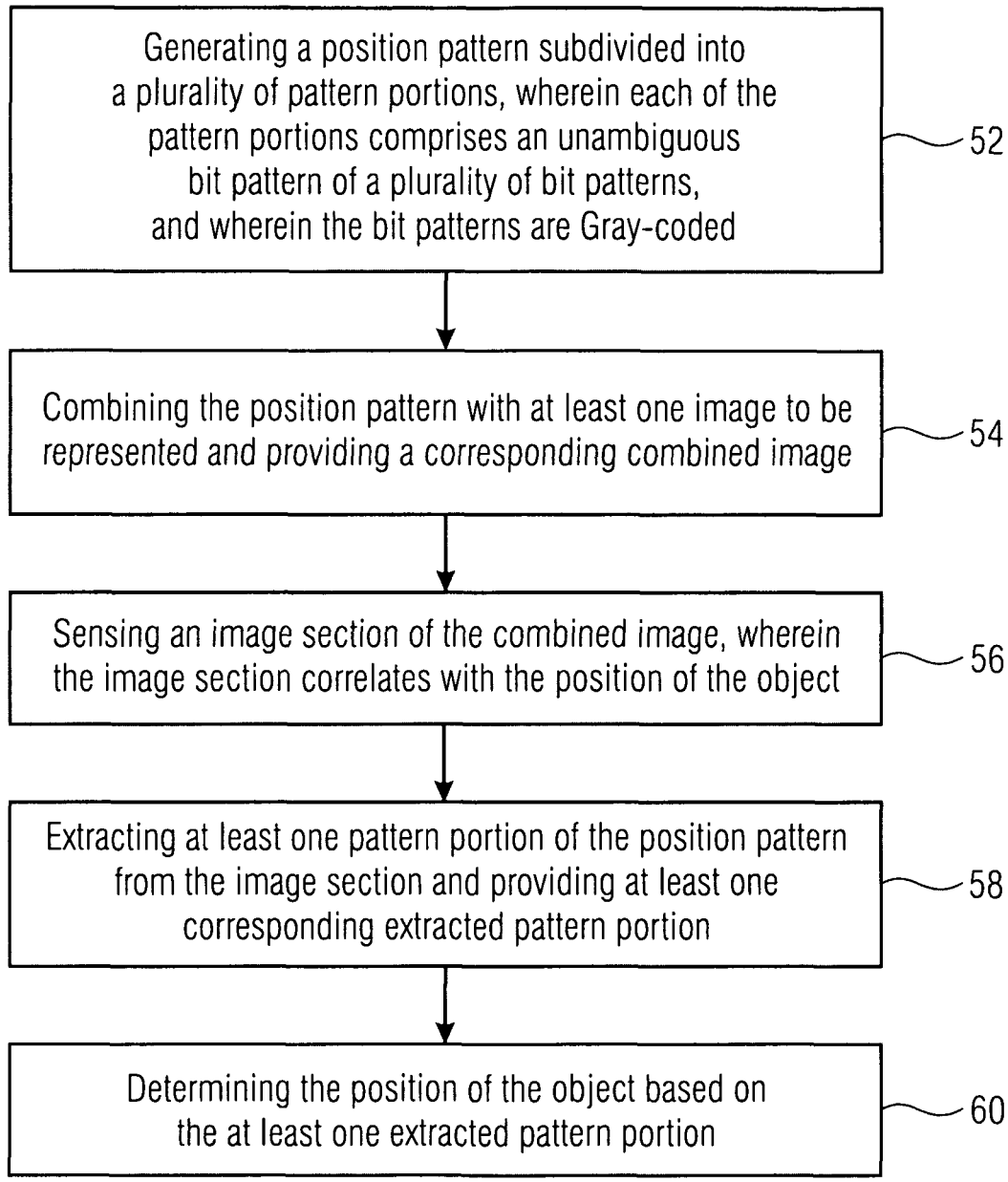
FIG. 13 a schematic flow chart of a method for determining a position of an object according to at least one embodiment of the technical teaching disclosed herein.

FIG. 13 shows a schematic flow chart of a method for determining a position of an object in accordance with at least one embodiment of the technical teaching disclosed herein. In step 52, a position pattern is generated, which is subdivided into a plurality of pattern portions, each of the pattern portions comprising an unambiguous bit pattern of a plurality of bit patterns. The bit patterns are Gray-coded. The position pattern may either be generated dynamically or be generated such that a stored position pattern is read out from a memory and provided for further processing. Gray coding of the bit pattern here means that two bit patterns belonging to adjacent pattern portions differ at most in a certain number of bits. In accordance with classical Gray coding, the bit patterns of adjacent pattern portions differ in only one bit. In accordance with a generalized definition of Gray coding, several bits of the bit pattern may change from one pattern portion to the adjacent pattern portion, wherein, however, an upper limit is typically not exceeded. In particular, it may be provided for the same number of bits to change from one pattern portion to the adjacent pattern portion, exemplarily two bits or three bits. In this way, the bit patterns of adjacent pattern portions are similar to one another. Due to the Gray coding, there are no abrupt changes in the coding of the bit patterns, as, for example, occur in conventional binary coding, when transiting from one power of two to the next higher power of two.

In step 54 of the method, the position pattern is combined with at least one image to be represented and a corresponding combined image is provided. The at least one image to be represented may be a single image from a sequence of images to be represented such that the position pattern may be combined with different images to be represented at different points in time. Even when later recognizing of the position pattern may be made more difficult by changing the image to be represented, recognizing the position pattern may be made possible relatively reliably by means of suitable measures. In particular, Manchester coding of the position pattern or regularly inserting reference images are to be mentioned in this context, which are not combined with the position pattern and thus allow drawing conclusions to the position pattern, for example by means of forming a difference. An image section of the combined image is sensed during step 56 of the method for determining the object position. The image section here correlates with the position of the object. This means that certain positions of the object are associated certain image sections. In particular, the object may be placed onto or within a representation of the image to be represented and thus may hide or occupy an image section. This hidden image section or image section occupied by the object may then correspond to the image section sensed. Furthermore, it is also possible for only part of the hidden image section or image section occupied by the object to be sensed and be used further within the method for determining the position as a sensed image section. In some embodiments, it may be provided for not only one image section to be sensed, but two image sections or several image sections which are associated to different regions of the object, exemplarily a first edge region and a second edge region. In this way, it is possible to not only determine the position of the object but also the orientation (position) thereof relative to the representation of the image to be represented, since there are two or more position data for the object and a connection may be made between two or more object-specific points and the two or more pieces of position information detected.

In step 58 of the method for determining the position, at least one pattern portion of the position pattern is extracted from the image section. Furthermore, a corresponding extracted pattern section is provided for further processing. Extracting the pattern portion may take place by means of a method for recognizing patterns. It is helpful here that, due to the Gray coding of the bit patterns, the bit patterns may be relatively short and a relation of adjacency of two or more pattern sections is also reflected in the respective bit patterns being similar. Since the image section may sense not only a single pattern portion but also two or more pattern portions, it is possible for two or more pattern portions to be sensed. An intermediate position of the object may, if applicable, be detected from said information, as will be described below.

The position of the object is determined in step 60 based on the at least one pattern portion extracted. Since the position pattern is subdivided into a plurality of pattern portions and the position pattern is combined with the at least one image to be represented, a connection may be made between the at least one pattern portion extracted and a point or region within the image to be represented. The position of the object may either match this point or region of the representation of the image to be represented or else correlates in a certain manner typically known before with the point or region cited.

Combining the position pattern with the at least one image to be represented in step 54 may include modulation of the image to be represented with the position pattern. Furthermore, generating the position pattern may include a Manchester-coding of the position pattern.

The method for determining the position of the object may additionally include transmitting object position data or intermediate data necessitated for determining the position from a transmitter to a receiver.

Figure 14A:
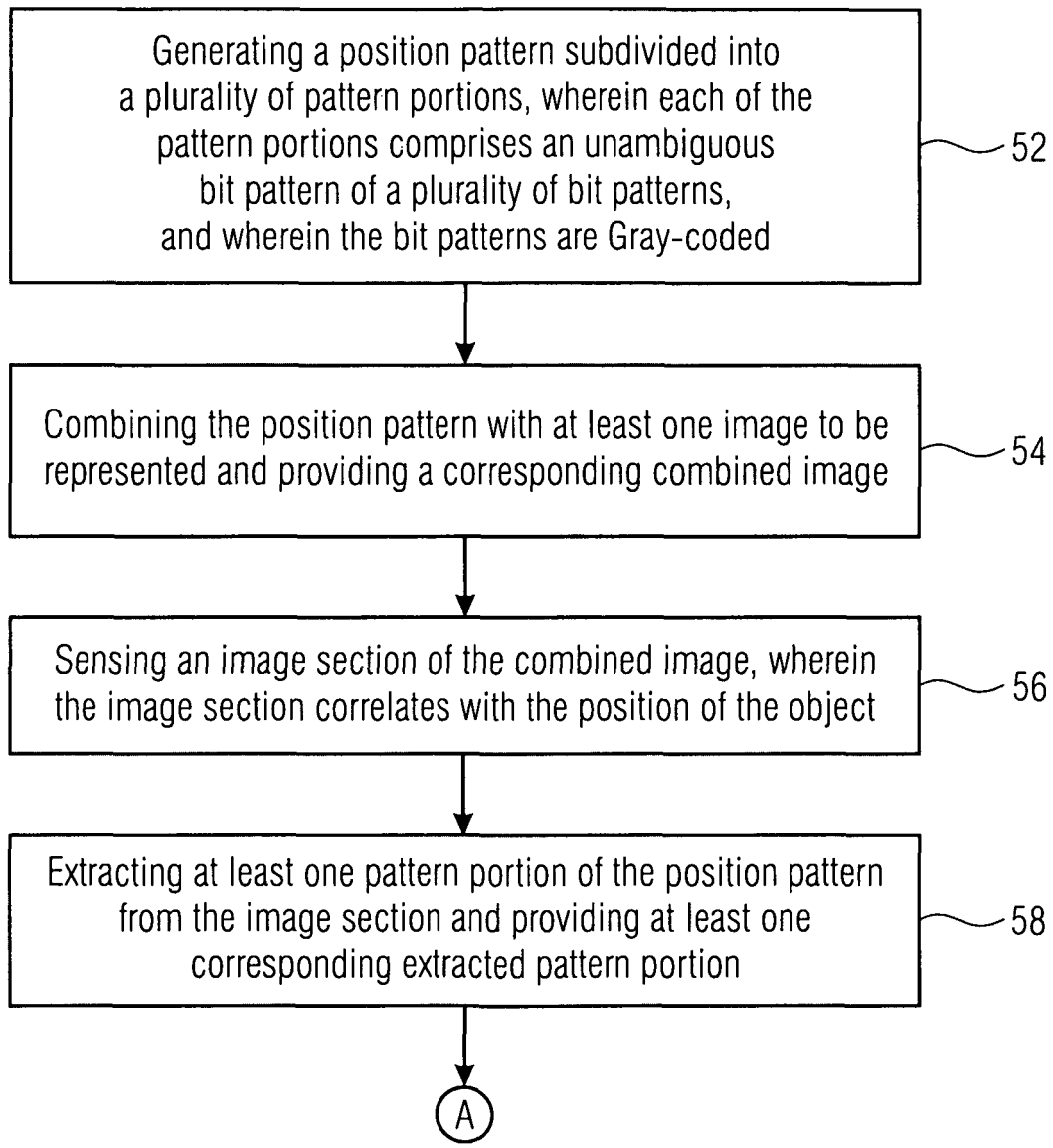
FIG. 14A, 14B a schematic flow chart of a method for determining a position of an object according to at least one embodiment of the technical teaching disclosed herein.
Figure 14B:
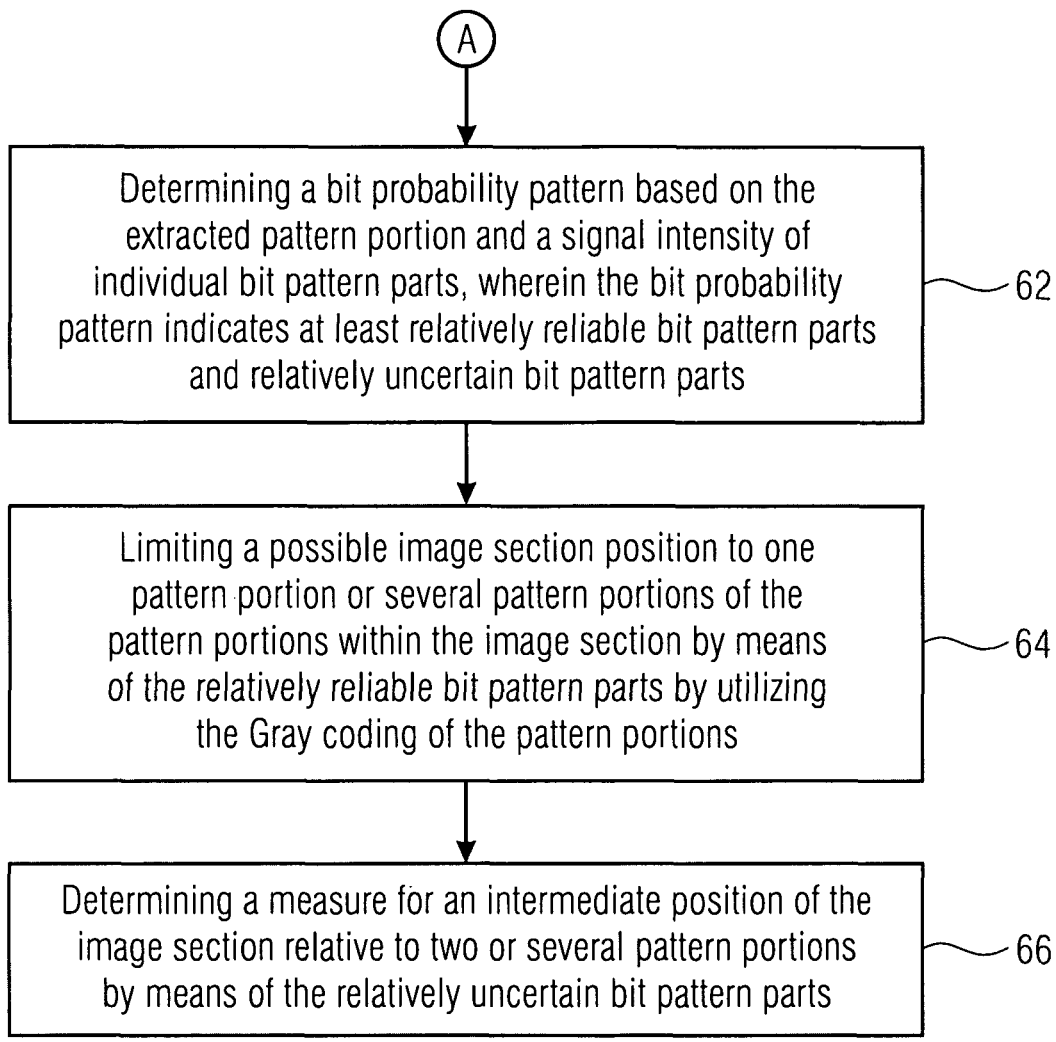

FIGS. 14*a* and 14*b* show a schematic flow chart of another potential embodiment of a method for determining the position of an object. The method includes steps 52 to 58 known from FIG. 13 so that reference is made here to the description thereof in connection with FIG. 13. Step 60 in which the position of the object is determined on the basis of the at least one pattern portion extracted is described in greater detail in steps 62 to 66.

In step 62, a bit probability pattern is determined on the basis of the extracted pattern portion and a signal intensity of individual bit pattern parts. The bit probability pattern exhibits relatively reliable bit pattern parts and relatively uncertain bit pattern parts. In particular, a reliability or confidence for the bit value detected may also be determined apart from a presumed bit value. The bit values and bit probability values may exemplarily also be represented in the form of intermediate values which are between two regular bit values. Exemplarily, two regular bit values may be a logic "0" and a logic "1" and intermediate values in the interval from 0 to 1 may indicate whether a bit will more probably be of the logic value "0" or the logic value "1". With an intermediate value of 0.5, for example, no unambiguous statement may be made as to whether the corresponding bit is of the bit value "0" or "1". In order to be able to represent intermediate values, the bit value may be represented as an analog signal or a digital signal at a higher resolution (i.e. more steps of discretization) than the actual bit pattern.

In step 64, a potential image section position is limited to one pattern portion or several pattern portions of the pattern portions within the image section by detecting the relatively reliable bit pattern parts making use of the Gray coding of the pattern portions. The relatively reliable bit pattern parts may typically be interpreted such that they indicate matching bit pattern parts of the different bit patterns belonging to the pattern portions present in the image section. An approximate position of the image section can already be detected due to the characteristics of Gray coding, wherein the precision is dependent on how many pattern portions at most may be present in the image section sensed by the optical sensor.

In addition to the relatively coarse limiting of the potential image section position just described, a measure for an intermediate position of the image section relative to two or more pattern portions may then be determined by means of the relatively uncertain bit pattern parts, as is illustrated in step 66 of the method for determining the position of the object. Exemplarily, the fact that the optical signals of the pattern portions contained in the image section overlap and a corresponding overlapped optical signal is sensed by the optical sensor 15 may be made use of for this purpose. In particular with brightness and/or intensity values, but also with different characteristics of the optical signal, an area part of a pattern portion within the image section helps to determine to which degree the optical signal emitted by the corresponding pattern portion enters the sense signal provided by the optical sensor 15. The sense signal exemplarily represents a weighted sum of the individual optical signals which are emitted by the different pattern portions contained to a greater or lesser degree in the image section. The weighting factors here are ratios of the respective pattern portion sub-areas contained in the image section to the entire area of the image section.

An image processing apparatus in accordance with at least one embodiment of the technical teaching disclosed herein includes an input for an image to be represented; a modulation image generator 22 for generating at least one modulation image, the modulation image being subdivided into a plurality of fields and a modulation image value of a certain field representing location information of the field within the modulation image; an image modulator for modulating the image to be represented with the modulation image, a difference between the image to be represented and an image modulated with the modulation image being below a threshold of perception of humans; and an output for the image modulated with the modulation image for being displayed on a display apparatus which may be connected to the output such that the location information may be reconstructed by evaluating the image displayed and modulated with the modulation image.

Finally, some technical characteristics of the image processing apparatus and the apparatus for determining an object position which may be present, but not necessarily, will be cited. The image processing apparatus and the apparatus for determining a position may particularly comprise one or several of the following characteristics.

The difference between the image to be represented and the image modulated with the modulation image may be in a wavelength range visible for humans.

Thus, the image modulator may be configured to additively overlap the image to be represented and the modulation image.

In the image processing apparatus, the image to be represented may comprise a bit resolution and the modulation may have an impact on a lower-value part of the bit resolution. In particular, the modulation may (only) have an effect on the least-valued bits of image points of the image to be represented.

In addition, the image to be represented may comprise at least a first color channel and a second color channel, the modulation image generator 22 being configured to represent a first spatial coordinate of the location information by a modulation of the first color channel and a second spatial coordinate of the location information by a modulation of the second color channel in the modulation image.

Thus, the location information may be Gray-coded relative to mutually adjacent fields of the modulation image.

Thus, the modulation image generator 22 may be configured to generate a sequence of modulation images, the location information represented by the modulation image value of the certain field of a certain modulation image of the sequence being part of combined location information of the certain field such that the combined location information may be reconstructed from the discrete location information of the sequence of modulation images.

Thus, the sequence of modulation images may include at least a temporal synchronization signal.

Additionally, the image modulator may include a Manchester coder configured to generate a first Manchester-coded modulation image and a second Manchester-coded modulation image from the modulation image, wherein the image modulator is configured to modulate the image to be represented successively with the first Manchester-coded modulation image and the second Manchester-coded modulation image and generate two correspondingly modulated images for being displayed on the display apparatus.

The image modulator may exhibit a modulation depth relative to the image to be represented which is smaller than or equaling 10% of a bit resolution of the image to be represented.

An optical sensor apparatus in accordance with one embodiment may include: an optical sensor for sensing electromagnetic radiation for generating a corresponding sense signal; an demodulator configured to demodulate the sense signal and to determine a modulation signal which may be contained in the sense signal, the demodulator including an amplitude-sensitive filter configured to extract at least one of a temporal change and a spatial change of the sense signal value comprising an amplitude within the limited amplitude region, for further processing.

Although some aspects have been described in connection with an apparatus, it is to be understood that these aspects also represent a description of the corresponding method such that a block or device of an apparatus is also to be understood to be a corresponding method step or a characteristic of a method step. In analogy, aspects having been described in connection with or as a method step also represent a description of a corresponding block or detail or characteristic of a corresponding apparatus. Some or all of the method steps may be executed by a hardware apparatus (or using a hardware apparatus), such as, for example, a microprocessor, a programmable computer or an electronic circuit. In some embodiments, some or several of the most important method steps may be executed by such an apparatus.

Depending on certain implementation requirements, embodiments of the invention may be implemented in either hardware or software. The implementation may be performed using a digital storage medium, such as, for example, a floppy disc, DVD, Blu-ray Disc, CD, ROM, PROM, EPROM, EEPROM or FLASH memory, a hard disc drive or another magnetic or optical storage on which electronically readable control signals are stored, which are able to cooperate or cooperate with a programmable computer system such that the respective method will be executed. This means that the digital storage medium may be computer-readable.

Thus, some embodiments in accordance with the invention include a data carrier comprising electronically readable control signals which are able to cooperate with a programmable computer system such that one of the methods described herein will be performed.

Generally, embodiments of the present invention may be implemented as a computer program product comprising program code, the program code being operative to perform one of the methods when the computer program product runs on a computer.

The program code may exemplarily be stored on a machine-readable carrier.

Different embodiments include the computer program for performing one of the methods described herein, the computer program being stored on a machine-readable carrier.

In other words, an embodiment of the inventive method thus is a computer program comprising program code for performing one of the methods described herein when the computer program runs on a computer.

A further embodiment of the inventive method thus is a data carrier (or a digital storage medium or a computer-readable medium) on which is recorded the computer program for performing one of the methods described herein.

Another embodiment of the inventive method thus is a data stream or sequence of signals representing the computer program for performing one of the methods described herein. The data stream or sequence of signals may exemplarily be configured to be transferred via a data communication connection, for example via the Internet.

Another embodiment includes processing means, exemplarily a computer or a programmable logic device configured or adapted to perform one of the methods described herein.

Another embodiment includes a computer on which is installed the computer program for performing one of the methods described herein.

Another embodiment in accordance with the invention includes an apparatus or system implemented to transmit a computer program for performing at least one of the methods described herein to a receiver. Transmission may exemplarily take place electronically or optically. The receiver may exemplarily be a computer, a mobile device, a storage device or a similar apparatus. The apparatus or system may exemplarily include a file server for transmitting the computer program to the receiver.

In some embodiments, a programmable logic device (exemplarily a field-programmable gate array or FPGA) may be used to perform some or all of the functionalities of the methods described herein. In some embodiments, a field-programmable gate array may cooperate with a microprocessor to perform one of the methods described herein. Generally, in some embodiments, the methods are performed on the part of any hardware apparatus. These may be universally usable hardware, like a computer processor (CPU), or hardware specific for the method, exemplarily an ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for determining a position of an object relative to a representation of an image to be represented, comprising:
   an input for at least one image to be represented;
   a position pattern generator configured to generate a position pattern which is subdivided into a plurality of pattern portions, each of the pattern portions comprising an unambiguous bit pattern of a plurality of bit patterns, the bit patterns being Gray-coded in a generalized manner;
   a combination unit configured to combine the position pattern with the at least one image to be represented and for providing a corresponding combined image;
   an optical sensor configured to optically sense an image section of the combined image, the image section being correlated with the position of the object;
   a filter configured to extract at least one bit pattern which corresponds to a pattern portion of the position pattern, from the image section and for providing at least one corresponding extracted pattern portion wherein the extracted pattern portion corresponds to a weighted sum of pattern portions which are at least partly within the image section; and a determiner configured to determine the position of the object on the basis of the at least one extracted bit pattern wherein the determiner is configured to form a bit probability pattern on the basis of the weighted sum of pattern portions, wherein the bit probability pattern indicates relatively reliable bit pattern parts and relatively uncertain bit pattern parts, wherein the relatively reliable bit pattern parts limit an image section position to one pattern portion or several pattern portions of the pattern portions within the image section and the relatively uncertain bit pattern parts represent an intermediate position of the image section relative to two or several pattern portions;

wherein the apparatus is implemented using a hardware apparatus, or using a computer, or using a combination of a hardware apparatus and a computer.

2. The apparatus in accordance with claim 1, wherein the bit pattern is a temporal bit pattern, a spatial bit pattern or a combination of a temporal bit pattern and a spatial bit pattern.

3. The apparatus in accordance with claim 1, wherein at least the optical sensor is part of a first separate unit, and wherein the first separate unit comprises a transmitter for transmitting object position data or intermediate data necessitated for determining the position of the object, to a receiver.

4. The apparatus in accordance with claim 1, wherein the combination unit is configured to modulate the image to be represented with the position pattern.

5. The apparatus in accordance with claim 1, wherein a position pattern part in the combined image is below a threshold of perception of humans and comprises defined characteristics relating to at least one of amplitude, color information, spatial frequency and temporal frequency, and wherein the filter is configured to extract image parts from the combined image, which correspond to the defined characteristics of the position pattern part so as to estimate therefrom the at least one extracted pattern portion.

6. The apparatus in accordance with claim 1, wherein the image to be represented comprises at least a first color channel and a second color channel, and wherein the position pattern generator is configured to represent a first spatial coordinate of location information associated to the individual pattern portions by modulation of the first color channel and a second spatial coordinate of the location information by modulation of the second color channel in the position pattern.

7. The apparatus in accordance with claim 1, wherein the position pattern within the combined image is within a wavelength range visible for humans.

8. The apparatus in accordance with claim 1, wherein the position pattern generator comprises a Manchester coder and the position pattern is Manchester-coded.

9. The apparatus in accordance with claim 1, wherein the position pattern generator is configured to insert synchronization information into the position pattern.

10. The apparatus in accordance with claim 1, wherein the position pattern is part of a position pattern sequence, and wherein the image to be represented is part of an image sequence, wherein the bit patterns of the individual pattern portions are distributed over the position pattern sequence.

11. A method for determining a position of an object relative to a representation of an image to be represented, comprising:

generating a position pattern which is subdivided into a plurality of pattern portions, each of the pattern portions comprising an unambiguous bit pattern of a plurality of bit patterns, the bit patterns being Gray-coded in a generalized manner;

combining the position pattern with at least one image to be represented and providing a corresponding combined image;

sensing an image section of the combined image, the image section being correlated with the position of the object and wherein, when sensing the image portion, two or more pattern portions may overlap which are at least partly within the image section;

extracting at least one pattern portion of the position pattern from the image section and for providing at least one corresponding extracted pattern section; and determining the position of the object on the basis of the at least one extracted pattern portion, comprising:

determining a bit probability pattern on the basis of the extracted pattern portion and a signal intensity of individual bit pattern parts, the bit probability pattern indicating at least relatively reliable bit pattern parts and relatively uncertain bit pattern parts;

limiting a potential image section position to one pattern portion or several pattern portions of the pattern portions within the image section by means of the relatively reliable bit pattern parts making use of the generalized Gray coding of the pattern portions;

determining a measure for an intermediate position of the image section relative to two or more pattern portions by means of the relatively uncertain bit pattern parts.

12. The method in accordance with claim 11, wherein combining the position pattern with the at least one image to be represented comprises modulation of the image to be represented with the position pattern.

13. The method in accordance with claim 11, further comprising Manchester coding of the position pattern.

14. The method in accordance with claim 11, further comprising transmitting object position data or intermediate data necessitated for determining the position of the object from a transmitter to a receiver.

15. A computer program comprising program code stored on a non-transitory computer-readable storage medium for executing the method in accordance with claim 11, when the computer program runs on a computer.

* * * * *